(12) United States Patent
Setoguchi

(10) Patent No.: US 8,642,681 B2
(45) Date of Patent: *Feb. 4, 2014

(54) SURFACE-COATED METALLIC PIGMENT, WATER BASE PAINT CONTAINING THE SAME, AND COATED PRODUCT TO WHICH WATER BASE PAINT HAS BEEN APPLIED

(75) Inventor: Shunichi Setoguchi, Osaka (JP)

(73) Assignee: Toyo Aluminium Kabushiki Kaisha, Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/322,238

(22) PCT Filed: Apr. 14, 2010

(86) PCT No.: PCT/JP2010/056693
§ 371 (c)(1),
(2), (4) Date: Nov. 23, 2011

(87) PCT Pub. No.: WO2010/137417
PCT Pub. Date: Dec. 2, 2010

(65) Prior Publication Data
US 2012/0065298 A1 Mar. 15, 2012

(30) Foreign Application Priority Data
May 25, 2009 (JP) ................. 2009-125585

(51) Int. Cl.
*C08K 9/00* (2006.01)
*C08F 2/44* (2006.01)

(52) U.S. Cl.
USPC ............................ 523/205; 524/849; 106/400

(58) Field of Classification Search
USPC .................. 524/115, 121, 127, 849; 523/205; 106/400
See application file for complete search history.

(56) References Cited

U.S. PATENT DOCUMENTS

| | | | |
|---|---|---|---|
| 4,621,112 A | 11/1986 | Backhouse et al. | |
| 4,735,984 A * | 4/1988 | Gouji et al. | 524/315 |
| 5,037,475 A | 8/1991 | Chida et al. | |
| 5,540,768 A | 7/1996 | Yamamoto et al. | |
| 7,253,216 B2 * | 8/2007 | Miyabayashi | 523/205 |
| 8,283,397 B2 * | 10/2012 | Terao et al. | 524/127 |
| 2004/0194663 A1 | 10/2004 | Li et al. | |
| 2005/0118380 A1 | 6/2005 | Hirata et al. | |
| 2008/0081864 A1 * | 4/2008 | Takano | 524/441 |
| 2009/0041942 A1 | 2/2009 | Hayashi et al. | |
| 2009/0117281 A1 | 5/2009 | Sato et al. | |
| 2011/0195244 A1 | 8/2011 | Setoguchi et al. | |

FOREIGN PATENT DOCUMENTS

| | | |
|---|---|---|
| CN | 101133128 A | 2/2008 |
| CN | 101273103 A | 9/2008 |
| EP | 0 583 919 A1 | 2/1994 |
| EP | 1837380 A1 | 9/2007 |
| JP | 61-047771 A | 3/1986 |
| JP | 0 240 367 A1 | 10/1987 |
| JP | 63-054475 A | 3/1988 |
| JP | 1-315470 A | 12/1989 |
| JP | 6-057171 A | 3/1994 |
| JP | 7-133440 A | 5/1995 |
| JP | 2000-044835 A | 2/2000 |
| JP | 2003-041150 A | 2/2003 |
| JP | 2003263780 A | 9/2003 |
| JP | 2004-124069 A | 4/2004 |
| JP | 2004-131542 A | 4/2004 |
| JP | 2006-169393 A | 6/2006 |
| JP | 2009108315 A | 5/2009 |
| WO | WO 2006064652 A1 | 6/2006 |
| WO | WO 2007052447 A1 | 5/2007 |
| WO | WO 2008044583 A1 | 4/2008 |
| WO | WO 2010032654 A1 | 3/2010 |

* cited by examiner

*Primary Examiner* — Hannah Pak
(74) *Attorney, Agent, or Firm* — Birch, Stewart, Kolasch & Birch, LLP

(57) ABSTRACT

A surface-coated metallic pigment according to the present invention includes base particles and a coating layer constituted of one layer, or two or more layers formed on a surface of the base particles, the coating layer having an outermost layer composed of a first compound obtained by polymerizing one monomer or oligomer, or two or more monomers or oligomers having one or more polymerizable double bonds, the outermost layer having a surface to which one surface modifier or two or more surface modifiers is/are bonded, and the surface modifier being a monomer or an oligomer having a bridged ring structure containing 9 to 12 carbon atoms and having one or more polymerizable double bonds.

9 Claims, No Drawings

SURFACE-COATED METALLIC PIGMENT, WATER BASE PAINT CONTAINING THE SAME, AND COATED PRODUCT TO WHICH WATER BASE PAINT HAS BEEN APPLIED

TECHNICAL FIELD

The present invention relates to a surface-coated metallic pigment, a water base paint containing the same, and a coated product to which the water base paint has been applied.

BACKGROUND ART

More attention has been paid to environmental issues in recent years, and a low-pollution water base paint without containing an organic solvent has attracted attention. In addition, with noticeable technical development in water base paints, appearance of high-grade finishing that could conventionally be achieved only by a solvent-type paint can now be realized also by a water base paint.

However, when a metal pigment is used as base particles having a metallic hue, and in particular, when an aluminum flake pigment (aluminum particles) or the like is used as such a metal pigment, the aluminum flake pigment or the like, if it is blended into a water base paint, may react with water in the paint to cause black discoloration or generate hydrogen gas, resulting in lowering of the storage stability of the water base paint.

In order to solve the problem of such lowering of the storage stability (i.e., lowering of the water resistance) that arises when a metal pigment is used in a water base paint, techniques such as a method wherein a metal pigment is treated with a phosphoric acid- or phosphoric acid ester-based additive (Japanese Patent Laying-Open No. 63-054475 (PTL 1), Japanese Patent Laying-Open No. 61-047771 (PTL 2), Japanese Patent Laying-Open No. 07-133440 (PTL 3), etc.); a method wherein a metal pigment is treated with a Mo (molybdenum) compound (Japanese Patent Laying-Open No. 06-057171 (PTL 4)); and a method wherein a metal pigment is coated with an oxide film such as silica, etc. (Japanese Patent Laying-Open No. 2003-041150 (PTL 5), Japanese Patent Laying-Open No. 2004-131542 (PTL 6), Japanese Patent Laying-Open No. 2004-124069 (PTL 7)), and so on have been developed. However, no metallic pigment is yet to be provided that has reached such a level that it satisfies sufficient storage stability of a water base paint, and in addition, sufficient humidity resistance of a coating film.

CITATION LIST

Patent Literature

PTL 1: Japanese Patent Laying-Open No. 63-054475
PTL 2: Japanese Patent Laying-Open No. 61-047771
PTL 3: Japanese Patent Laying-Open No. 07-133440
PTL 4: Japanese Patent Laying-Open No. 06-057171
PTL 5: Japanese Patent Laying-Open No. 2003-041150
PTL 6: Japanese Patent Laying-Open No. 2004-131542
PTL 7: Japanese Patent Laying-Open No. 2004-124069

SUMMARY OF INVENTION

Technical Problem

The present invention was made in view of the above-described current circumstances. An object of the present invention is to provide a surface-coated metallic pigment that, when used in a water base paint, achieves excellent storage stability of the water base paint, and also achieves excellent humidity resistance of the coating film.

Solution to Problem

A surface-coated metallic pigment according to the present invention includes base particles and a coating layer constituted of one layer, or two or more layers formed on a surface of the base particles. The coating layer has an outermost layer composed of a first compound obtained by polymerizing one monomer or oligomer, or two or more monomers or oligomers having one or more polymerizable double bonds. The outermost layer has a surface to which one surface modifier or two or more surface modifiers is/are bonded. The surface modifier is a monomer or an oligomer having a bridged ring structure containing 9 to 12 carbon atoms and having one or more polymerizable double bonds.

Here, the bridged ring structure is preferably any of a dicyclopentanyl group that may be substituted or unsubstituted, a dicyclopentenyl group that may be substituted or unsubstituted, an isobornyl group that may be substituted or unsubstituted, and an adamantyl group that may be substituted or unsubstituted. The surface modifier is preferably contained at a ratio of 0.005 to 10 parts by mass with respect to 100 parts by mass of the base particles.

Preferably, the first compound is obtained by polymerizing two or more monomers or oligomers, at least one of which is a monomer or an oligomer having a bridged ring structure containing 9 to 12 carbon atoms and having two or more polymerizable double bonds. In this case, the bridged ring structure is preferably a dicyclopentanyl group that may be substituted or unsubstituted.

Preferably, the first compound is obtained by polymerizing two or more monomers or oligomers, in which the monomer or oligomer having a bridged ring structure containing 9 to 12 carbon atoms and having two or more polymerizable double bonds is contained at a ratio of 10 to 70 mass %.

Moreover, the base particles may have a structure including a substrate, and an inorganic pigment and/or an organic pigment adhered to a surface of the substrate. Alternatively, the base particles may have a structure including a substrate, and one or more inorganic compound layers or metal layers having an interferential action and formed on a surface of the substrate.

The present invention also relates to a water base paint including at least one type of the surface-coated metallic pigment according to any of the above, and a coated product to which the water base paint has been applied.

Advantageous Effects of Invention

When used in a water base paint, the surface-coated metallic pigment according to the present invention exhibits an excellent effect of achieving excellent storage stability of the water base paint, and also achieving excellent humidity resistance of a coating film.

DESCRIPTION OF EMBODIMENTS

The present invention will be described in greater detail below.

<Surface-Coated Metallic Pigment>

The surface-coated metallic pigment according to the present invention has a structure including base particles and a coating layer constituted of one layer, or two or more layers formed on a surface of the base particles. The coating layer is preferably formed to entirely cover the surface of the base particles. However, cases where a portion of the surface of the base particles is not coated with the coating layer are also encompassed within the scope of the present invention, so long as the effects as described above are achieved.

The surface-coated metallic pigment according to the present invention as described above is used by being blended into a metallic-type paint for use in coating metals or plastics. In particular, when the surface-coated metallic pigment is used in a water base paint, it exhibits excellent storage stability (water resistance), and a coating film to which the water base paint has been applied exhibits excellent humidity resistance.

<Base Particles>

The base particles included in the surface-coated metallic pigment according to the present invention are not particularly limited, and any conventionally known base particles can be used so long as they are usable as base particles for a metallic pigment of this type. For example, metal particles or inorganic compound particles can be used as such base particles. Examples of metal particles include metal particles of aluminum, zinc, copper, bronze, nickel, titanium, stainless, and the like, as well as alloy particles thereof. Among these metal particles, aluminum particles are particularly suitable because they are excellent in metallic gloss, inexpensive, small in specific gravity, and hence easy to handle. Meanwhile, examples of inorganic compound particles include glass, mica, ceramic particles (alumina, titania, or the like), and the like.

Aluminum particles particularly suitable as the base particles will be described hereinafter.

Firstly, a shape of such aluminum particles is not particularly limited, and for example, various shapes such as particles, a plate, a lump, a flake (a scale), and the like may be adopted, however, in order to provide a coating film with excellent brightness, a flake shape is preferred. The aluminum particles normally have an average particle size preferably from approximately 1 to 100 µm and more preferably from 3 to 60 µm. If the aluminum particles have an average particle size smaller than 1 µm, the surface-coated metallic pigment according to the present invention is difficult to handle in its manufacturing process, and also shows a tendency to easily aggregate. On the other hand, if the aluminum particles have an average particle size exceeding 100 µm, a surface of the coating film roughens, and a preferred design may not be realized.

If such aluminum particles have a flake shape, an average thickness thereof is not particularly limited, however, it is preferably not smaller than 0.005 µm and particularly more preferably not smaller than 0.02 µm. In addition, the average thickness is preferably not greater than 5 µm and particularly more preferably not greater than 3 µm. If the aluminum particles have an average thickness smaller than 0.005 µm, the surface-coated metallic pigment according to the present invention is difficult to handle in its manufacturing process, and also shows a tendency to easily aggregate. On the other hand, if the aluminum particles have an average thickness exceeding 5 µm, feel of particles of the coating film (irregularities) becomes noticeable or hiding capability is insufficient, and a preferred design may not be realized.

An average particle size of the aluminum particles as above can be found by calculating an average volume based on a particle size distribution determined by a known particle size distribution measurement method such as laser diffractometry, micromesh sieve or a Coulter counter method. An average thickness can be calculated based on the hiding capability and density of the aluminum particles.

The aluminum particles in a flake shape as above can be obtained, for example, by grinding aluminum powders used as a raw material with a ball mill or the like. A grinding agent added at the time of grinding may adsorb on the surface of the aluminum particles in a flake shape (also referred to as aluminum flakes) thus obtained. Examples of grinding agents include fatty acids such as oleic acid and stearic acid, aliphatic amines, aliphatic amides, aliphatic alcohols, ester compounds, and the like. These agents have an effect to suppress undue oxidation of the surface of the aluminum particles and to improve gloss. An amount of adsorption of the grinding agent is preferably less than 2 parts by mass with respect to 100 parts by mass of the aluminum particles. The amount of adsorption less than 2 parts by mass is advantageous in that lowering in gloss of the surface can be suppressed and a coating layer readily adheres.

Meanwhile, the base particles used in the present invention may have a structure including a substrate, and an inorganic pigment and/or an organic pigment adhered to a surface of the substrate. Alternatively, the base particles may have a structure including a substrate, and one or more inorganic compound layers or metal layers having an interferential action and formed on a surface of the substrate. Here, the substrate corresponds to each of the base particles described above, and in particular, the aluminum particles are preferably used. That is, colored aluminum particles having an inorganic pigment and/or an organic pigment adhered to its surface, or interference color aluminum particles having one or more inorganic compound layers or metal layers exhibiting an interferential action on the surface of the aluminum particles can also be used as the aluminum particles. By using such colored aluminum particles (colored base particles) or interference color aluminum particles (interference color base particles), a coating film having a unique design can be formed.

Here, the above-mentioned inorganic pigment or organic pigment is not particularly limited, however, examples thereof include quinacridone, diketopyrrolopyrrole, isoindolinone, indanthrone, perylene, perinone, anthraquinone, dioxazine, benzimidazolone, triphenylmethane quinophthalone, anthrapyrimidine, chrome yellow, pearl mica, transparent pearl mica, colored mica, interference mica, phthalocyanine, halogenated phthalocyanine, an azo pigment (an azomethine metal complex, a condensed azo, or the like), titanium oxide, carbon black, iron oxide, copper phthalocyanine, a condensed polycyclic pigment, and the like. Such an inorganic pigment or organic pigment can be adhered to the surface of the aluminum particles (base particles), for example, by coating the pigment with a dispersant and thereafter stirring and mixing with the aluminum particles (base particles) in a non-polar solvent.

Meanwhile, a method of forming one or more inorganic compound layers or metal layers exhibiting an interferential action is not particularly limited, however, for example, a sol-gel process, solution deposition, electroless plating, chemical vapor deposition, physical vapor deposition, or the like can be employed. A chemical substance used here is not particularly limited, however, examples thereof include a metallic substance (to serve as a metal layer) composed of a metal such as gold, silver, copper, nickel, cobalt, titanium, aluminum, silicon, or the like, or an alloy thereof, or an oxide of such a metal or an alloy thereof (to serve as an inorganic compound layer), and the like. The number of inorganic compound layers or metal layers is not particularly limited, and it may be one, or two or more. It is noted that such an inorganic compound layer or metal layer has a thickness preferably from 5 to 200 nm and more preferably from 10 to 150 nm.

In addition, depending on usage, an inorganic layer or an organic layer providing various functions may be provided in advance on the surface of the aluminum particles as pretreatment, before an inorganic pigment or an organic pigment adheres to the surface of the aluminum particles in the colored aluminum particles described above, or before an inorganic compound layer or a metal layer exhibiting an interferential action is formed on the surface of the aluminum particles in the interference color aluminum particles.

<Coating Layer>

The coating layer according to the present invention is formed on the surface of the base particles, and is constituted of one layer, or two or more layers. This coating layer has an outermost layer composed of a first compound obtained by polymerizing one monomer or oligomer, or two or more monomers or oligomers having one or more polymerizable double bonds. The outermost layer has a surface to which one surface modifier or two or more surface modifiers is/are bonded. The surface modifier is a monomer or an oligomer having a bridged ring structure containing 9 to 12 carbon atoms and having one or more polymerizable double bonds. When the coating layer according to the present invention is constituted only of one layer, the layer serves as the outermost layer.

Since the coating layer according to the present invention has the structure as described above, even when base particles highly reactive with water are used, namely, for example, aluminum particles are used as the base particles, the coating layer serves to extremely effectively prevent such base particles from contacting and reacting with water.

Though depending on the specific surface area of the base particles, suitably, a coating amount of this coating layer is preferably set to 3 to 40 parts by mass, and more preferably 5 to 20 parts by mass, with respect to 100 parts by mass of the base particles. If the coating amount exceeds 40 parts by mass, there may be a tendency toward loss of metallic gloss of the base particles. If the coating amount is less than 3 parts by mass, reaction between the base particles and water may not be sufficiently suppressed.

Examples of layers other than the outermost layer when the coating layer is constituted of two or more layers include a resin coating layer for protecting the inorganic compound layer(s) or metal layer(s) having an interferential action and formed on the surface of the substrate, a resin coating layer for physically protecting an adhesion state of pigment(s) in the substrate particles to which an inorganic pigment and/or an organic pigment are/is adhered, and the like.

<Outermost Layer>

The outermost layer according to the present invention is a layer forming the surface of the coating layer, and is composed of a first compound obtained by polymerizing one monomer or oligomer, or two or more monomers or oligomers having one or more polymerizable double bonds.

Although such a first compound is not particularly limited so long as it has the composition described above, examples of monomers or oligomers having one or more polymerizable double bonds include unsaturated carboxylic acids (for example, acrylic acid, methacrylic acid, itaconic acid, fumaric acid, and the like), esters of unsaturated carboxylic acids (for example, acrylic acid esters, methacrylic acid esters, itaconic acid esters, fumaric acid esters, and the like), nitriles of unsaturated carboxylic acids (for example, acrylic acid nitrile, methacrylic acid nitrile, and the like), phosphoric acid esters (for example, 2-methacryloyloxyethyl acid phosphate, di-2-methacryloyloxyethyl acid phosphate, tri-2-methacryloyloxyethyl acid phosphate, 2-acryloyloxyethyl acid phosphate, di-2-acryloyloxyethyl acid phosphate, tri-2-acryloyloxyethyl acid phosphate, diphenyl-2-methacryloyloxyethyl acid phosphate, diphenyl-2-acryloyloxyethyl acid phosphate, dibutyl-2-methacryloyloxyethyl acid phosphate, dibutyl-2-acryloyloxyethyl acid phosphate, 2-methacryloyloxypropyl acid phosphate, bis(2-chloroethyl)vinyl phosphonate, diallyldibutyl phosphonosuccinate, and the like), and the like.

When two or more types of such monomers or oligomers are used, a monomer or an oligomer having two or more polymerizable double bonds in the molecule is preferably used as at least one type thereof, whereby a dense crosslinked structure of the first compound can be suitably achieved. Examples of such monomers or oligomers having two or more polymerizable double bonds in the molecule include divinylbenzene, allylbenzene, diallyl benzene, epoxidized 1,2-polybutadiene, (meth)acrylic-modified polyester, (meth)acrylic-modified polyether, (meth)acrylic-modified urethane, (meth)acrylic-modified epoxy, trimethylolpropane tri(meth)acrylate, tetramethylol propane tri(meth)acrylate, tetramethylolpropane tetra(meth)acrylate, pentaerythritol tetra(meth)acrylate, dipentaerythritol hexa(meth)acrylate, ditrimethylolpropane tetra(meth)acrylate, and the like. As used herein, the term "(meth)acrylic" means acrylic or methacrylic, and the term "(meth)acrylate" means acrylate or methacrylate, as commonly used in this technical field.

Further, preferably, the first compound according to the present invention is obtained by polymerizing two or more monomers or oligomers, at least one of which is a monomer or an oligomer having a bridged ring structure containing 9 to 12 carbon atoms and having two or more polymerizable double bonds. The bridged ring structure in this case is particularly preferably a dicyclopentanyl group that may be substituted or unsubstituted. In all of the monomers or oligomers forming the first compound, the monomer or oligomer having a bridged ring structure containing 9 to 12 carbon atoms and having two or more polymerizable double bonds is preferably contained at a ratio of 10 to 70 mass %. This ratio is more preferably 30 to 50 mass %. Such a composition of the first compound is preferred because the hydrophobicity of the outermost layer is improved, and reaction between the base particles and water can be more sufficiently suppressed. This excellent effect is presumably achieved because, by setting the composition of the first compound as above, a synergistic effect is produced together with surface modifier(s) described later.

This effect is effectively achieved by setting the above-described ratio to 10 mass % or higher. If the ratio exceeds 70% by mass, molecular binding in the crosslinked structure is less likely to become dense, and water molecules tend to permeate through the outermost layer, causing lowering of the above-described effect.

Here, examples of the monomer or oligomer having a bridged ring structure containing 9 to 12 carbon atoms and having two or more polymerizable double bonds include tricyclodecane dimethanol diacrylate, tricyclodecane dimethanol dimethacrylate, and the like.

<Surface Modifier>

The outermost layer of the present invention has a surface to which one surface modifier or two or more surface modifiers is/are bonded. The surface modifier is characterized by being a monomer or an oligomer having a bridged ring structure containing 9 to 12 carbon atoms and having one or more polymerizable double bonds.

Here, the bridged ring structure is preferably any of a dicyclopentanyl group that may be substituted or unsubstituted, a dicyclopentenyl group that may be substituted or unsubstituted, an isobornyl group that may be substituted or unsubstituted, and an adamantyl group that may be substituted or unsubstituted. Suitably, such a surface modifier is preferably contained at a ratio of 0.005 to 10 parts by mass, and more preferably at a ratio of 0.1 to 5 parts by mass, with respect to 100 parts by mass of the base particles.

The outermost layer of the present invention has such surface modifier(s) bonded to its surface, and thereby exhibits high hydrophobicity and can extremely effectively prevent the base particles from contacting with water. Hence, when used in a water base paint, the surface-coated metallic pigment according to the present invention exhibits a remarkable effect of achieving excellent storage stability of the water base paint, and also achieving excellent humidity resistance of the coating film. If the ratio of the surface modifier exceeds 10 parts by mass, there may be a tendency toward loss of metallic gloss of the base particles. If the ratio is less than 0.005 part by mass, the expression of a sufficient hydrophobic effect is difficult, and the above-described effect may not be achieved.

The surface modifier according to the present invention may form a layer by being bonded to the outermost layer (i.e., the first compound), or may be bonded in an interspersed manner at an outermost surface portion of the outermost layer, rather than forming a layer. Further, such surface modifiers may also be bonded to each other, as well as being bonded to the outermost layer. Therefore, the surface of the outermost layer may be coated with a layered network structure formed of such surface modifiers. It is noted that, although the bond between the outermost layer and the surface modifier, as well as the bond between the surface modifiers, are presumed to be mainly achieved by chemical bonding, physical bonding such as adsorption or the like is not excluded.

Here, examples of the monomer or oligomer having a bridged ring structure containing 9 to 12 carbon atoms and having one or more polymerizable double bonds include:

compounds having a dicyclopentanyl group that may be substituted or unsubstituted, i.e., dicyclopentanyloxyethyl (meth)acrylate, dicyclopentanyl(meth)acrylate, and tricyclodecane dimethanol di(meth)acrylate;

compounds having a dicyclopentenyl group that may be substituted or unsubstituted, i.e., dicyclopentenyloxyethyl (meth)acrylate, dicyclopentenyloxypropyl(meth)acrylate, and dicyclopentenyl(meth)acrylate;

a compound having an isobornyl group that may be substituted or unsubstituted, i.e., isobornyl(meth)acrylate;

compounds having an adamantyl group that may be substituted or unsubstituted, i.e., 1-adamantyl(meth)acrylate, 2-methyl-2-adamantyl(meth)acrylate, and 1,3-adamantane dimethanol di(meth)acrylate, and the like. In the present invention, the bonding site to other functional group, and the position of substitution, if any substituents are present, in the dicyclopentanyl group, dicyclopentenyl group, isobornyl group, adamanthyl group, or the like, may be any site and position, respectively, and are not particularly limited.

Examples of substituents include, but are not limited to, methyl, ethyl, hydroxyl, hydroxymethyl, and amino groups. As used herein, the expression "that may be substituted or unsubstituted" means that an embodiment not including such a substituent is also encompassed in the present invention.

<Manufacturing Method>

The surface-coated metallic pigment according to the present invention can be manufactured as follows.

First, the base particles are dispersed in an organic solvent, heated and stirred. At least one monomer or oligomer having one or more polymerizable double bonds, which is to form the first compound, is then added to the dispersion while stirring as above, and a polymerization initiator is also added thereto. This causes the monomer or oligomer to be polymerized and also adhered to the surface of the base particles, resulting in the formation of a coating layer (i.e., the outermost layer) on the surface of the base particles.

An organic solvent inert to the base particles is preferably used as the organic solvent. Examples of such organic solvents include aliphatic hydrocarbons such as hexane, heptane, octane, and mineral spirit, aromatic hydrocarbons such as benzene, toluene, xylene, and solvent naphtha, ethers such as tetrahydrofuran and diethylether, esters such as ethyl acetate and butyl acetate, and the like.

An amount of the organic solvent used is preferably from 300 to 3000 parts by mass, and more preferably from 500 to 1500 parts by mass, with respect to 100 parts by mass of the base particles. If the amount of the organic solvent is less than 300 parts by mass, the viscosity of the dispersion is too high, making it difficult to form a uniform outermost layer on the surface of the base particles. If the amount exceeds 3000 parts by mass, the polymerization time tends to be too long.

The polymerization initiator is not particularly limited, and a polymerization initiator generally known as a radical generator can be used. Specific examples thereof include peroxides such as benzoyl peroxide, lauroyl peroxide, isobutyl peroxide, and methyl ethyl ketone peroxide, azo compounds such as AIBN (azo bis isobutyronitrile), and the like.

A blending amount of the polymerization initiator is preferably set to 0.5 to 20 parts by mass with respect to 100 parts by mass of the first compound that is to form the outermost layer. If the blending amount of the polymerization initiator is less than 0.5 part by mass, the polymerization reaction may not proceed, and a desired amount of the outermost layer may not be formed. If the blending amount of the polymerization initiator exceeds 20 parts by mass, polymerization may proceed rapidly to cause aggregation of the base particles, and hence, the resulting color hue may become poor.

A temperature for performing the polymerization is preferably a temperature at which a half-life of the polymerization initiator is 20 hours or shorter, and particularly more preferably a temperature at which the half-life is 10 hours or shorter. For example, when AIBN is used as the polymerization initiator, a temperature range from 70 to 90° C. is preferred. In this polymerization step (the outermost layer formation step), in order to enhance the polymerization yield, it is advantageous to block oxygen, and then conduct the polymerization step in an atmosphere of an inert gas such as nitrogen, helium or argon.

Next, the surface modifier is bonded to the surface of the outermost layer formed as above. This is achieved by a method in which the surface modifier is added at the stage of completion of the above-described polymerization.

That is, simply by adding the surface modifier to the above-described dispersion, the surface modifier is bonded to the outermost layer, because of radicals remaining at the stage of completion of the polymerization in the outermost layer formation step described above. Here, it is advantageous to further add a polymerization initiator to cause the bonding to proceed reliably. Here, a reaction time is preferably set to about 0.5 to 2 hours, and throughout this reaction period, heating and stirring of the above-described dispersion is continued.

Then, after the bonding of the surface modifier to the outermost layer has been completed, the surface-coated metallic pigment according to the present invention and the organic solvent are subjected to solid-liquid separation through a filter, thereby obtaining a surface-coated metallic pigment in powder form or a surface-coated metallic pigment in paste form having an appropriate solids concentration. Here, although an organic solvent used at the time of the solid-liquid separation or wetting such as making of a paste is not particularly limited, the organic solvent for the above-described dispersion may be replaced with a hydrophilic organic solvent to thereby impart affinity for dispersion in a water base paint.

Examples of such hydrophilic organic solvents include methyl alcohol, ethyl alcohol, isopropyl alcohol, n-propyl alcohol, t-butyl alcohol, n-butyl alcohol, isobutyl alcohol, ethylcellosolve, butylcellosolve, propylene glycol monobutyl ether, dipropylene glycol monomethyl ether, propylene glycol monopropyl ether, acetone, and the like.

<Water Base Paint and Coated Product>

The surface-coated metallic pigment according to the present invention is suitably used in a water base paint. Therefore, the present invention also relates to a water base paint including at least one type of the surface-coated metallic pigment, and further relates to a coated product to which the water base paint has been applied.

An amount of the surface-coated metallic pigment blended into the water base paint according to the present invention is preferably set to 0.1 to 50 parts by mass, and more preferably 1 to 30 parts by mass, with respect to 100 parts by mass of a binder for a paint. When the content of the surface-coated metallic pigment is not less than 0.1 part by mass, an intended design can be achieved satisfactorily. When the content is not more than 50 parts by mass, the coating film has good reflection performance.

Here, examples of the above-mentioned binder for a paint include, but are not particularly limited to, thermosetting acrylic resin/melamine resin, thermosetting acrylic resin/CAB (cellulose acetate butyrate)/melamine resin, thermosetting polyester (alkyd) resin/melamine resin, thermosetting polyester (alkyd)/CAB/melamine resin, isocyanate-curing urethane resin/room temperature-curing acrylic resin, water-dilutable acrylic emulsion/melamine resin, and the like.

The water base paint also contains an appropriate solvent. While water is suitable as such a solvent, organic solvents such as alcohols, glycols, ketones, esters, ethers, hydrocarbons, and the like can also be used.

The water base paint may also be blended, as needed, with an additive such as a pigment dispersant, an anti-foaming agent, an anti-settling agent, a curing catalyst, or the like, or with another coloring pigment, for example, an organic coloring pigment, an inorganic coloring pigment, pearl mica, alumina flakes, plate-like iron oxide, silica flakes, or the like.

Although the type of such a water base paint is not particularly limited, a room temperature-curing water base paint is preferred. In this case, the room temperature-curing water base paint includes one-component type and a mixture of two or more components. This room temperature-curing water base paint may accompany reaction.

As an emulsion or a water-soluble binder used in this room temperature-curing water base paint, any of various natural or synthetic polymers such as acrylic, alkyd, polyester, urethane, vinyl acetate, and silicon polymers, or an oligomer, a prepolymer, or the like can be used.

Meanwhile, examples of objects to be coated to which the water base paint as described above is applied include plastics such as polystyrene, polypropylene, polycarbonate, polyurethane resin, ABS resin, PET resin, and the like, wood, metals, and the like.

EXAMPLES

The present invention will be described hereinafter in more detail with reference to examples, however, the present invention is not limited thereto.

Example 1

First, aluminum particles were used as base particles. The aluminum particles had a paste form as a result of washing a paste containing the aluminum particles (trademark "7640NS", average particle size of the aluminum particles: 17 μm, pasting agent: mineral spirit, manufactured by TOYO Aluminium K.K.) with mineral spirit, followed by filtering. An amount of a non-volatile component (the aluminum particles) in the paste after filtering was 67 mass % (the remainder was mineral spirit).

To a 3-liter separable flask, 447.8 g of the paste (containing 300 g of the non-volatile component) and 1400 g of mineral spirit were added, and then the mixture was stirred to obtain slurry. While this stirring was continued, nitrogen gas was introduced into the system to attain a nitrogen atmosphere. The temperature was then raised to 80° C. The following operation was performed while the present condition was maintained, unless otherwise specified.

Next, as monomers forming a first compound, 2.17 g of acrylic acid, 8.66 g of epoxidized 1,2-polybutadiene (diluted to 50 mass % with mineral spirit), 13.00 g of trimethylolpropane triacrylate, 23.83 g of divinylbenzene, and 1.67 g of azo bis isobutyronitrile (AIBN) as a polymerization initiator were added to the above slurry, and these monomers were polymerized, thereby forming an outermost layer on a surface of the substrate particles.

Then, after 3 hours from supplying AIBN, 2.10 g of isobornyl methacrylate (trademark "LIGHT-ESTER IB-X", manufactured by Kyoeisha Chemical Co., Ltd.) as a surface modifier and 0.5 g of AIBN as an additional polymerization initiator were further added. Polymerization reaction was further continued for 5 hours, and then the reaction was completed by cooling, thereby bonding the surface modifier to a surface of the outermost layer.

The slurry above was subsequently filtered and washed with a small amount of mineral spirit, and then the mineral spirit was further washed away and replaced with propylene glycol monomethyl ether, thereby obtaining a surface-coated metallic pigment according to the present invention in paste form. A content of the surface modifier in the surface-coated metallic pigment according to Example 1 was 0.7 part by mass with respect to 100 parts by mass of the base particles.

Example 2

A surface-coated metallic pigment according to the present invention was obtained in paste form in completely the same manner as in Example 1, except that 2.10 g of dicyclopentanyl methacrylate (trademark "FANCRYL FA-513M", manufactured by Hitachi Chemical Co., Ltd.) was used as the surface modifier instead of isobornyl methacrylate in Example 1. A content of the surface modifier in the surface-coated metallic pigment according to Example 2 was 0.7 part by mass with respect to 100 parts by mass of the base particles.

Example 3

A surface-coated metallic pigment according to the present invention was obtained in paste form in completely the same manner as in Example 1, except that 2.10 g of dicyclopentenyl acrylate (trademark "FANCRYL FA-511 AS", manufactured by Hitachi Chemical Co., Ltd.) was used as the surface modifier instead of isobornyl methacrylate in Example 1. A content of the surface modifier in the surface-coated metallic pigment according to Example 3 was 0.7 part by mass with respect to 100 parts by mass of the base particles.

Example 4

First, aluminum particles were used as base particles. The aluminum particles had a paste form as a result of washing a paste containing the aluminum particles (trademark "7640NS", average particle size of the aluminum particles: 17 μm, pasting agent: mineral spirit, manufactured by TOYO Aluminium K.K.) with mineral spirit, followed by filtering. An amount of a non-volatile component (the aluminum particles) in the paste after filtering was 67 mass % (the remainder was mineral spirit).

To a 3-liter separable flask, 447.8 g of the paste (containing 300 g of the non-volatile component) and 1400 g of mineral spirit were added, and then the mixture was stirred to obtain slurry. While this stirring was continued, nitrogen gas was introduced into the system to attain a nitrogen atmosphere. The temperature was then raised to 80° C. The following operation was performed while the present condition was maintained, unless otherwise specified.

Next, as monomers forming a first compound, 2.17 g of acrylic acid, 8.66 g of epoxidized 1,2-polybutadiene (diluted to 50 mass % with mineral spirit), 10.83 g of trimethylolpropane triacrylate, 13.00 g of divinylbenzene, 13.00 g of tricyclodecane dimethanol dimethacrylate (trademark "LIGHT-ESTER DCP-M", manufactured by Kyoeisha Chemical Co., Ltd.), and 1.67 g of azo bis isobutyronitrile (AIBN) as a polymerization initiator were added to the above slurry, and these monomers were polymerized, thereby forming an outermost layer on a surface of the substrate particles.

Then, after 3 hours from supplying AIBN, 2.10 g of isobornyl methacrylate (trademark "LIGHT-ESTER IB-X", manufactured by Kyoeisha Chemical Co., Ltd.) as a surface modifier and 0.5 g of AIBN as an additional polymerization initiator were further added. Polymerization reaction was further continued for 5 hours, and then the reaction was completed by cooling, thereby bonding the surface modifier to a surface of the outermost layer.

The slurry above was subsequently filtered and washed with a small amount of mineral spirit, and then the mineral spirit was further washed away and replaced with propylene glycol monomethyl ether, thereby obtaining a surface-coated metallic pigment according to the present invention in paste form.

A content of the surface modifier in the surface-coated metallic pigment according to Example 4 was 0.7 part by mass with respect to 100 parts by mass of the base particles. Among the monomers forming the outermost layer (the first compound) of the surface-coated metallic pigment, tricyclodecane dimethanol dimethacrylate (corresponding to the monomer or oligomer having a bridged ring structure containing 9 to 12 carbon atoms and having two or more polymerizable double bonds) was contained at a ratio of 30 mass %.

Example 5

A surface-coated metallic pigment according to the present invention was obtained in paste form in completely the same manner as in Example 4, except that 2.10 g of dicyclopentanyl methacrylate (trademark "FANCRYL FA-513M", manufactured by Hitachi Chemical Co., Ltd.) was used as the surface modifier instead of isobornyl methacrylate in Example 4. A content of the surface modifier in the surface-coated metallic pigment according to Example 5 was 0.7 part by mass with respect to 100 parts by mass of the base particles.

Comparative Example 1

First, aluminum particles were used as base particles. The aluminum particles had a paste form as a result of washing a paste containing the aluminum particles (trademark "7640NS", average particle size of the aluminum particles: 17 μm, pasting agent: mineral spirit, manufactured by TOYO Aluminium K.K.) with mineral spirit, followed by filtering. An amount of a non-volatile component (the aluminum particles) in the paste after filtering was 67 mass % (the remainder was mineral spirit).

To a 3-liter separable flask, 447.8 g of the paste (containing 300 g of the non-volatile component) and 1400 g of mineral spirit were added, and then the mixture was stirred to obtain slurry. While this stirring was continued, nitrogen gas was introduced into the system to attain a nitrogen atmosphere. The temperature was then raised to 80° C.

Next, as monomers forming a first compound, 2.17 g of acrylic acid, 8.66 g of epoxidized 1,2-polybutadiene (diluted to 50 mass % with mineral spirit), 13.00 g of trimethylolpropane triacrylate, 23.83 g of divinylbenzene, and 1.67 g of azo bis isobutyronitrile (AIBN) as a polymerization initiator were added to the above slurry, and these monomers were polymerized, thereby forming an outermost layer on a surface of the base particles (that is, the above operation is the same as that in Example 1).

Then, after 8 hours from supplying AIBN, the reaction was completed by cooling. The slurry above was subsequently filtered and washed with a small amount of mineral spirit, and then the mineral spirit was further washed away and replaced with propylene glycol monomethyl ether, thereby obtaining a comparative surface-coated metallic pigment in paste form. This surface-coated metallic pigment had a structure corresponding to that of the surface-coated metallic pigment according to the present invention (the surface-coated metallic pigment according to Example 1), except that no surface modifier was bonded to the outermost layer.

Comparative Example 2

A comparative surface-coated metallic pigment was obtained in paste form in completely the same manner as in Example 1, except that 2.10 g of cyclohexyl methacrylate (trademark "LIGHT-ESTER CH", manufactured by Kyoeisha Chemical Co., Ltd.) was used as the surface modifier instead of isobornyl methacrylate in Example 1. This surface-coated metallic pigment corresponds to a surface-coated metallic pigment in which a compound different from the surface modifier according to the present invention was bonded to the outermost layer.

Comparative Example 3

A comparative surface-coated metallic pigment was obtained in paste form in completely the same manner as in Example 1, except that 2.10 g of benzyl methacrylate (trademark "LIGHT-ESTER BZ", manufactured by Kyoeisha Chemical Co., Ltd.) was used as the surface modifier instead of isobornyl methacrylate in Example 1. This surface-coated metallic pigment corresponds to a surface-coated metallic pigment in which a compound different from the surface modifier according to the present invention was bonded to the outermost layer.

Comparative Example 4

A comparative surface-coated metallic pigment was obtained in paste form in completely the same manner as in Example 1, except that 2.10 g of n-lauryl methacrylate (trademark "LIGHT-ESTER L", manufactured by Kyoeisha Chemical Co., Ltd.) was used as the surface modifier instead of isobornyl methacrylate in Example 1. This surface-coated metallic pigment corresponds to a surface-coated metallic pigment in which a compound different from the surface modifier according to the present invention was bonded to the outermost layer.

Comparative Example 5

A comparative surface-coated metallic pigment was obtained in paste form in completely the same manner as in Example 4, except that 13.00 g of isobornyl methacrylate was used as a monomer forming a first compound, instead of tricyclodecane dimethanol dimethacrylate, and that no surface modifier was used. This surface-coated metallic pigment corresponds to a surface-coated metallic pigment in which, although a monomer having a bridged ring structure containing 9 to 12 carbon atoms and having one polymerizable double bond was contained as the monomer forming the first compound, no surface modifier was bonded to the outermost layer.

<Preparation of Water Base Paint>

By using each of the surface-coated metallic pigments according to the Examples and Comparative Examples obtained above, a water base paint containing each surface-coated metallic pigment was prepared as follows.

(Preparation of Rheology Control Agent)

A rheology control agent (hereinafter also denoted as a "composition 1") was prepared by mixing 19.5 parts by mass of a polyamide-based rheology control agent (trademark "DISPARLON AQ600", manufactured by Kusumoto Chemicals, Ltd.), 6 parts by mass of butylcellosolve, and 106.5 parts by mass of ion exchange water, followed by stirring for 1 hour.

(Preparation of Resin Solution)

A resin solution (hereinafter also denoted as a "composition 2") was prepared by mixing 27.9 parts by mass of an acrylic copolymer (trademark "Setaqua 6802", manufactured by Neuplex), 16.8 parts by mass of a polyurethane dispersion A (trademark "Bayhydrol XP2621", manufactured by Bayer Material Science), 4.1 parts by mass of a polyurethane dispersion B (trademark "Bayhydrol PT241", manufactured by Bayer Material Science), 1.9 parts by mass of a melamine resin solution (trademark "Cymel 327", manufactured by Mitsui Cytec Ltd.), 5.3 parts by mass of butylcellosolve, 0.3 part by mass of an anti-foaming/leveling agent (trademark "AQ7120", manufactured by Kusumoto Chemicals, Ltd.), and 12.4 parts by mass of ion exchange water, followed by stirring for 30 minutes or longer.

(Preparation of Metallic Base)

A metallic base (hereinafter also denoted as a "composition 3") was prepared by adding, to each of the surface-coated metallic pigments produced in the Examples and Comparative Examples having a non-volatile content of 4.4 parts by mass, 0.4 part by mass of a dispersant (trademark "AQ320", manufactured by Kusumoto Chemicals, Ltd.) and butylcellosolve as the remainder to prepare a total of 15.00 parts by mass, followed by stirring and mixing for 10 minutes.

(Preparation of Aqueous Base Metallic Paint)

To 96.2 parts by mass of the resin solution ("composition 2") was added 10.5 parts by mass of the metallic base ("composition 3"), and the mixture was stirred and mixed for 10 minutes or longer. Next, 12.3 parts by mass of the rheology control agent ("composition 1") was slowly added to this mixture solution, and further stirred and mixed for 10 minutes.

Subsequently, 10 mass % of an aqueous solution of dimethylethanolamine was added to the above mixture so as to adjust the pH of the mixture to 8.3±0.1, and the mixture was further stirred and mixed for 10 minutes or longer. Then lastly, an appropriate amount of ion exchange water was added so as to adjust the viscosity to a reference value (25 seconds as measured by Ford cup No. 4), and the mixture was stirred and mixed for 10 minutes or longer, thereby preparing an aqueous base metallic paint (water base paint).

(Preparation of Paint for Clear Coating)

Here, 51.15 g of a polyacrylate (trademark "Desmophen A870BA", manufactured by Bayer Material Science), 0.53 g of an additive A (a 10% xylene solution of trademark "Baysilone Paint Additive OL17", manufactured by Borchers), 0.53 g of an additive B (a 1% xylene solution of trademark "Modaflow", manufactured by Monsanto), 5.3 g of an additive C (a 10% xylene solution of trademark "Tinuvin292", manufactured by Ciba Spezialitatenchemie Lampertheim), 10.7 g of an additive D (a 10% xylene solution of trademark "Tinuvin1130", manufactured by Ciba Spezialitatenchemie Lampertheim), 10.17 g of a dilution solvent A (1-methoxy propyl acetate:solvent naphtha=1:1), and 2.13 g of a dilution solvent B (butyl glycol acetate) were mixed and stirred for 30 minutes or longer.

Then, 19.49 g of a mixture of a mixed solvent (butyl acetate:solvent naphtha=1:1) and an isocyanurate (trademark "Sumidur N3300", manufactured by Sumika Bayer Urethane, Co., Ltd.) diluted at 9:1 was added to the above mixture, and the resultant mixture was mixed and stirred for 30 minutes or longer, thereby preparing a paint for a clear coating.

<Method of Fabricating Painted Plate>

A metal plate was spray-painted with the aqueous base metallic paint prepared as above. The obtained spray-painted plate was set at room temperature (20° C.) for 5 minutes or longer and thereafter the spray-painted plate was dried at 80° C. for 3 minutes.

Thereafter, the spray-painted plate was set at room temperature for 10 minutes or longer and thereafter the paint for a clear coating was further applied to the spray-painted plate by spraying. After the paint for a clear coating was applied, the plate was set at room temperature for 10 minutes or longer, and then baking at 130° C. was performed for 30 minutes to thereby obtain a spray-painted plate.

With regard to a thickness of the coating film in this painted plate, a coating condition in spray-painting above was adjusted such that a coating film formed using the aqueous base metallic paint had a thickness from 14 to 18 μm and a coating film formed using the paint for a clear coating had a thickness from 35 to 40 μm.

<Coating Film Humidity Resistance Test>

The painted plate obtained with the "Method of Fabricating Painted Plate" above was stored for 10 days in a humidity resistance tester maintained at 40° C. and a humidity of 98% or higher. Gloss retention, color difference, and adhesion of the coating film of the painted plate before and after the storage were evaluated.

(1) Gloss Retention

Regarding gloss of the coating film, glossiness of 20 was measured with a glossimeter (trademark "Gloss Meter VG2000", manufactured by Nippon Denshoku Industries Co., Ltd.). Denoting a measurement value of glossiness of 20 of the coating film before storage in the humidity resistance tester for 10 days as G1 and denoting a measurement value of glossiness of 20 of the coating film after storage in the humidity resistance tester for 10 days as G2, gloss retention R was calculated as shown in the equation below.

$$R\,(\%) = (G2/G1) \times 100$$

Evaluation as "excellent" was made when R was not lower than 95%, evaluation as "good" was made when R was not lower than 90% and lower than 95%, and evaluation as "poor" was made when R was lower than 90%. This means that the coating film had the highest humidity resistance when it was evaluated as "excellent".

(2) Color Difference

With regard to the coating film of the painted plate obtained with the "Method of Fabricating Painted Plate" above, a variable colorimeter (trademark "X-Rite MA-68II", manufactured by X-Rite) was used to measure values for $L^*_{45}$, $a^*_{45}$ and $b^*_{45}$ of the coating film at an observation angle of 45 degrees (light reception in a direction of normal of the coating film), and color difference $\Delta E^*_{45}$ of the coating film before and after storage for 10 days in the humidity resistance tester was determined.

Evaluation as "excellent" was made when $\Delta E^*_{45}$ was lower than 3, evaluation as "good" was made when $\Delta E^*_{45}$ was not lower than 3 and lower than 7, and evaluation as "poor" was made when $\Delta E^*_{45}$ was 7 or higher. This means that the coating film had the highest humidity resistance when it was evaluated as "excellent".

(3) Adhesion

Regarding the coating film of the painted plate obtained with the "Method of Fabricating Painted Plate" above, a grid-shaped cut having squares at 2 mm interval was made over a region with a width of 2 cm and a length of 2 cm on the coating film of the painted plate after storage for 10 days in the humidity resistance tester above, Sellotape® ("CT-24", manufactured by Nichiban Co., Ltd.) was adhered to the cut portion, and pulled at an angle of 45 degrees, and a degree of peel-off of the grid-shaped portion above of the coating film was visually observed.

Evaluation as "excellent" was made when there was no peel-off, evaluation as "good" was made when there was slight peel-off, and evaluation as "poor" was made when there was peel-off in multiple portions. This means that the coating film had the highest humidity resistance when it was evaluated as "excellent".

<Gas Generation Test for Paint>

In order to confirm storage stability of the aqueous base metallic paint produced as above, a gas generation test for the paint was performed.

A test condition was as follows: a 200 g sample of the paint was placed in a glass bottle and allowed to stand for 1 week in a thermostatic bath set to 40° C., and an amount of gas generated during the 1 week (hydrogen gas is generated upon reaction between the base particles and moisture in the water base paint in the surface-coated metallic pigment) was measured.

Evaluation as "excellent" was made when the amount of gas generated per 200 g of the paint was less than 4 ml, evaluation as "good" was made when the amount was not less than 4 ml and less than 8 ml, and evaluation as "poor" was made when the amount was not less than 8 ml. This means that the paint had the highest storage stability when it was evaluated as "excellent".

<Evaluation Results>

Table 1 shows the foregoing evaluation results, together with a composition of each of the surface-coated metallic pigments.

TABLE 1

|  |  | Examples | | | | |
|---|---|---|---|---|---|---|
|  |  | 1 | 2 | 3 | 4 | 5 |
| Composition of Outermost Layer (mass %) | Acrylic Acid | 5 | 5 | 5 | 5 | 5 |
|  | Epoxidized 1,2-Polybutadiene | 10 | 10 | 10 | 10 | 10 |
|  | Trimethylolpropane Triacrylate | 30 | 30 | 30 | 25 | 25 |
|  | Divinylbenzene | 55 | 55 | 55 | 30 | 30 |
|  | Tricyclodecane Dimethanol Dimethacrylate | 0 | 0 | 0 | 30 | 30 |
|  | Isobornyl Methacrylate | 0 | 0 | 0 | 0 | 0 |
| Surface Modifier (part(s) by mass with respect to 100 parts by mass of the base particles) | Isobornyl Methacrylate | 0.7 | — | — | 0.7 | — |
|  | Dicyclopentanyl Methacrylate | — | 0.7 | — | — | 0.7 |
|  | Dicyclopentenyl Acrylate | — | — | 0.7 | — | — |
|  | Cyclohexyl Methacrylate | — | — | — | — | — |
|  | Benzyl Methacrylate | — | — | — | — | — |
|  | n-Lauryl Methacrylate | — | — | — | — | — |
| Coating Film Humidity Resistance Test | Gloss Retention | Excellent | Excellent | Excellent | Excellent | Excellent |
|  | Color Difference | Excellent | Excellent | Excellent | Excellent | Excellent |
|  | Adhesion | Excellent | Excellent | Excellent | Excellent | Excellent |
| Gas Generation Test for Paint |  | Excellent | Excellent | Excellent | Excellent | Excellent |

TABLE 1-continued

| | | Comparative Examples | | | | |
|---|---|---|---|---|---|---|
| | | 1 | 2 | 3 | 4 | 5 |
| Composition of Outermost Layer (mass %) | Acrylic Acid | 5 | 5 | 5 | 5 | 5 |
| | Epoxidized 1,2-Polybutadiene | 10 | 10 | 10 | 10 | 10 |
| | Trimethylolpropane Triacrylate | 30 | 30 | 30 | 30 | 25 |
| | Divinylbenzene | 55 | 55 | 55 | 55 | 30 |
| | Tricyclodecane Dimethanol Dimethacrylate | 0 | 0 | 0 | 0 | 0 |
| | Isobornyl Methacrylate | 0 | 0 | 0 | 0 | 30 |
| Surface Modifier (part(s) by mass with respect to 100 parts by mass of the base particles) | Isobornyl Methacrylate | — | — | — | — | |
| | Dicyclopentanyl Methacrylate | — | — | — | — | |
| | Dicyclopentenyl Acrylate | — | — | — | — | |
| | Cyclohexyl Methacrylate | | 0.7 | — | — | |
| | Benzyl Methacrylate | | — | 0.7 | — | |
| | n-Lauryl Methacrylate | | — | — | 0.7 | |
| Coating Film Humidity Resistance Test | Gloss Retention | Excellent | Excellent | Excellent | Excellent | Good |
| | Color Difference | Good | Good | Good | Good | Good |
| | Adhesion | Excellent | Excellent | Excellent | Excellent | Good |
| Gas Generation Test for Paint | | Poor | Poor | Poor | Poor | Poor |

As is clear from Table 1, it was confirmed that, when the surface-coated metallic pigment according to each of the Examples having the composition of the present invention is used in a water base paint, it exhibits an excellent effect of achieving excellent storage stability of the water base paint, and also achieving excellent humidity resistance of a coating film.

Though the embodiments and the examples of the present invention have been described as above, combination of the features in each embodiment and example described above as appropriate is originally intended.

It should be understood that the embodiments and examples disclosed herein are illustrative and non-restrictive in every respect. The scope of the present invention is defined by the terms of the claims, rather than by the foregoing description, and is intended to include any modifications within the scope and meaning equivalent to the terms of the claims.

The invention claimed is:

1. A surface-coated metallic pigment comprising:
   base particles; and
   a coating layer constituted of one layer, or two or more layers formed on a surface of the base particle, wherein
      said coating layer has an outermost layer composed of a first compound obtained by polymerizing two or more monomers or oligomers having one or more polymerizable double bonds,
      said outermost layer has a surface to which one surface modifier or two or more surface modifiers is/are bonded, and
      said surface modifier is a monomer or an oligomer having a bridged ring structure containing 9 to 12 carbon atoms and having one or more polymerizable double bonds,
   wherein said first compound obtained by polymerizing two or more monomers or oligomers, at least one of which is a monomer or an oligomer having a bridged ring structure containing 9 to 12 carbon atoms and having two or more polymerizable double bonds.

2. The surface-coated metallic pigment according to claim 1, wherein
   said bridged ring structure is any of a dicyclopentanyl group that is substituted or unsubstituted, a dicyclopentenyl group that is substituted or unsubstituted, an isobornyl group that is substituted or unsubstituted, and an adamantyl group that is substituted or unsubstituted.

3. The surface-coated metallic pigment according to claim 1, wherein
   said surface modifier is contained at a ratio of 0.005 to 10 parts by mass with respect to 100 parts by mass of said base particles.

4. The surface-coated metallic pigment according to claim 1, wherein said bridged ring structure of said first compound is a dicyclopentanyl group that is substituted or unsubstituted.

5. The surface-coated metallic pigment according to claim 1, wherein said first compound is obtained by polymerizing two or more monomers or oligomers, in which the monomer or oligomer having a bridged ring structure containing 9 to 12 carbon atoms and having two or more polymerizable double bonds is contained at a ratio of 10 to 70 mass %.

6. The surface-coated metallic pigment according to claim 1, wherein
   said base particle has a structure including a substrate, and an inorganic pigment and/or an organic pigment adhered to a surface of the substrate.

7. The surface-coated metallic pigment according to claim 1, wherein
   said base particle includes a substrate, and one or more inorganic compound layers or metal layers having an interferential action and formed on a surface of the substrate.

8. A water base paint comprising at least one surface-coated metallic pigment according to claim 1.

9. A coated product to which the water base paint according to claim 8 has been applied.

* * * * *

UNITED STATES PATENT AND TRADEMARK OFFICE
CERTIFICATE OF CORRECTION

| | | |
|---|---|---|
| PATENT NO. | : 8,642,681 B2 | Page 1 of 1 |
| APPLICATION NO. | : 13/322238 | |
| DATED | : February 4, 2014 | |
| INVENTOR(S) | : Shunichi Setoguchi | |

It is certified that error appears in the above-identified patent and that said Letters Patent is hereby corrected as shown below:

ON THE TITLE PAGE:

At item (56), in the right-hand column, in the FOREIGN PATENT DOCUMENTS, insert the following:

--EP          0 240 367 A1          10/1987--.

IN THE CLAIMS:

In claim 1, at column 17, line 64, after "compound", insert --is--.

Signed and Sealed this
Eighth Day of July, 2014

Michelle K. Lee
*Deputy Director of the United States Patent and Trademark Office*